(12) United States Patent
Yoshizumi

(10) Patent No.: US 11,795,586 B2
(45) Date of Patent: Oct. 24, 2023

(54) COMPOSITE CORD AND TIRE USING SAME

(71) Applicant: Sumitomo Rubber Industries, Ltd., Hyogo (JP)

(72) Inventor: Takuma Yoshizumi, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 313 days.

(21) Appl. No.: 17/280,588

(22) PCT Filed: Sep. 19, 2019

(86) PCT No.: PCT/JP2019/036695
§ 371 (c)(1),
(2) Date: Mar. 26, 2021

(87) PCT Pub. No.: WO2020/075466
PCT Pub. Date: Apr. 16, 2020

(65) Prior Publication Data
US 2021/0370719 A1      Dec. 2, 2021

(30) Foreign Application Priority Data

Oct. 12, 2018   (JP) ................. 2018-193644

(51) Int. Cl.
*D02G 3/48*      (2006.01)
*B60C 9/00*      (2006.01)
*D02G 3/04*      (2006.01)

(52) U.S. Cl.
CPC .............. *D02G 3/48* (2013.01); *B60C 9/005* (2013.01); *B60C 9/0042* (2013.01); *D02G 3/047* (2013.01); *D10B 2331/021* (2013.01)

(58) Field of Classification Search
CPC ........ D02G 3/047; D02G 3/48; B60C 9/0042; B60C 9/005
See application file for complete search history.

(56) References Cited

U.S. PATENT DOCUMENTS 3,253,638 A * 5/1966 Kersker ............... D02G 3/48
152/554
3,552,468 A * 1/1971 Gallagher ............. D02G 3/48
152/557

(Continued)

FOREIGN PATENT DOCUMENTS

EP       2 065 222 A1    6/2009
JP       2013-146954 A   8/2013

(Continued)

OTHER PUBLICATIONS

International Search Report issued in PCT/JP2019/036695; dated Dec. 10, 2019.

(Continued)

*Primary Examiner* — Shaun R Hurley
(74) *Attorney, Agent, or Firm* — Studebaker & Brackett PC

(57) ABSTRACT

A composite cord is composed of two first strands formed of aramid fibers and one second strand formed of nylon fibers. In a cross section perpendicular to a length direction, a ratio L2/L0 of a length L2 of an exposed surface of the second strand along the outer cord periphery to a length L0 of an exposed surface of the composite cord along the outer cord periphery is in a range of 0.30 or more and 0.40 or less.

10 Claims, 4 Drawing Sheets

(56) References Cited

U.S. PATENT DOCUMENTS

| | | | | |
|---|---|---|---|---|
| 4,155,394 | A * | 5/1979 | Shepherd | D02G 3/48 57/238 |
| 4,234,030 | A * | 11/1980 | Van Nieuwal | B60C 9/28 152/557 |
| 6,799,618 | B2 * | 10/2004 | Reuter | D02G 3/48 152/526 |
| 7,107,751 | B2 * | 9/2006 | Nuesch | D07B 1/025 57/237 |
| 7,484,545 | B2 * | 2/2009 | Westgate | D02G 3/48 152/556 |
| 2004/0118499 | A1 * | 6/2004 | Reuter | B60C 9/2204 152/533 |
| 2007/0137754 | A1 * | 6/2007 | Westgate | B60C 9/005 152/527 |
| 2009/0020208 | A1 * | 1/2009 | Fukumoto | D02G 3/48 152/556 |
| 2009/0139626 | A1 * | 6/2009 | Ozaki | D02G 3/48 152/527 |
| 2010/0024948 | A1 * | 2/2010 | Westgate | B60C 9/0042 525/419 |
| 2010/0224302 | A1 * | 9/2010 | Fukumoto | B60C 9/0042 152/556 |
| 2010/0263781 | A1 * | 10/2010 | Yamaguchi | D02G 3/48 152/556 |
| 2011/0259488 | A1 * | 10/2011 | Zhao | B60C 17/0009 152/152.1 |
| 2013/0319594 | A1 * | 12/2013 | Kawashima | B60C 9/0042 57/244 |
| 2015/0298408 | A1 * | 10/2015 | Fukumoto | B29D 30/16 156/117 |
| 2017/0100964 | A1 | 4/2017 | Mori | |

FOREIGN PATENT DOCUMENTS

| | | | | |
|---|---|---|---|---|
| JP | 2013-147214 | A | | 8/2013 |
| JP | 2013146954 | A * | 8/2013 | B29B 15/08 |
| JP | 2015205479 | A | | 11/2015 |
| WO | WO-2009063913 | A1 * | 5/2009 | B60C 9/005 |
| WO | 2017/068394 | A1 | | 4/2017 |
| WO | WO-2017068394 | A1 * | 4/2017 | B60C 9/0042 |

OTHER PUBLICATIONS

The extended European search report issued by the European Patent Office dated Jun. 1, 2022, which corresponds to European Patent Application 19871981.7-1012 and is related to U.S. Appl. No. 17/280,588.

* cited by examiner

COMPOSITE CORD AND TIRE USING SAME

TECHNICAL FIELD

The present invention relates to a composite cord having improved adhesion to rubber and a tire using the same.

BACKGROUND ART

The following Patent Document 1 proposes a pneumatic tire which uses a composite cord made of a plurality of strands, for example two first strands made of aramid fiber and one second strand made of nylon fiber, twisted together as a band cord.

Due to the high elasticity properties of aramid fibers, this composite cord can increase tire rigidity, therefore, steering stability of tires can be improved. In addition, when used in combination with the second strand made of nylon fiber, it can prevent fracture damage caused by compression fatigue, which is a disadvantage of aramid fibers.

However, due to their molecular structure, aramid fibers have the disadvantage of poor adhesion to rubber.

As a result, the composite cords tend to peel off from the rubber during running, and there is still room for improvement in the durability of the tire, especially with regard to high-speed durability.

PRIOR ART DOCUMENT

Patent Document

Patent Document 1

Japanese Unexamined Patent Application Publication No. 2015-205479

SUMMARY OF THE INVENTION

Problems to be Solved by the Invention

The object of the present invention is to provide a composite cord and a tire using the composite cord, which can increase the adhesiveness with rubber while ensuring the advantages of the composite cord, and can further improve the durability, especially the high-speed durability, of the tire when used as a tire cord.

Means for Solving the Problems

The first invention of the present application is a composite cord consisting of two first strands formed of aramid fibers and one second strand formed of nylon fibers, wherein in a cross section perpendicular to a cord length direction, a ratio L2/L0 of a length L0 of an exposed surface of the composite cord along a circumference of the cord and a length L2 of an exposed surface of the second strand along the circumference of the cord is in a range of 0.30 or more and 0.40 or less.

In the composite cord according to the present invention, it is preferred that a ratio S2/S0 of a cord cross-sectional area S0 of the composite cord and a cross-sectional area S2 of the second strand is 0.3 or less.

In the composite cord according to the present invention, it is preferred that the composite cord has a 2+1 twisted structure in which an intermediate strand formed by two first strands twisted together and one second strand are twisted together.

In the composite cord according to the present invention, it is preferred that a twist direction F20 of an upper twist of the composite cord is opposite to a twist direction F21 of an intermediate twist of the intermediate strand and a twist direction F22 of a lower twist of the second strand.

In the composite cord according to the present invention, it is preferred that a twist direction F23 of a lower twist of each of the first strands forming the intermediate strand is opposite to the twist direction F21 of the intermediate strand.

In the composite cord according to the present invention, it is preferred that when the upper twist of the composite cord has the number of twists N20, the intermediate twist of the intermediate strand has the number of twists N21, the lower twist of the second strand has the number of twists N22, and the lower twist of each of the first strands has the number of twists N23, a following relationship is satisfied:

$$N21 \leq N20 \leq N22 \leq N23.$$

In the composite cord according to the present invention, it is preferred that the composite cord has a 2+1 twisted structure in which an intermediate strand formed by one first strand and one second strand twisted together and one first strand are twisted together.

In the composite cord according to the present invention, it is preferred that a twist direction F30 of an upper twist of the composite cord is opposite to a twist direction F31 of an intermediate twist of the intermediate strand and a twist direction F32 of a lower twist of the first strand.

In the composite cord according to the present invention, it is preferred that a twist direction F33 of the lower twist of the first strand forming the intermediate strand and a twist direction F34 of a lower twist of the second strand are opposite to the twist direction F31 of the intermediate twist of the intermediate strand.

In the composite cord according to the present invention, it is preferred that when the upper twist of the composite cord has the number of twists N30, an intermediate twist of the intermediate strand has the number of twists N31, a lower twist of the first strand has the number of twists N32, and a lower twist of the first strand forming the intermediate strand has the number of twists N33, and a lower twist of the second strand has the number of twists N34, either of following relationships is satisfied:

$$N30 \leq N31 \leq N33 \leq N32 \text{ or}$$

$$N30 \leq N31 \leq N34 \leq N32.$$

The second invention of the present application is a tire using the composite cord of the first invention as a tire cord.

Effects of the Invention

In the present invention, in the cross section perpendicular to the length direction of the composite cord, the ratio L2/L0 of the length L0 of the exposed surface of the composite cord along the circumference of the cord and the length L2 of the exposed surface of the second strand along the circumference of the cord is set to 0.30 or more.

As a result, it is possible that a sufficient area is secured for the second strand made of nylon fibers to adhere to the rubber, therefore, the adhesiveness of the composite cord to the rubber is improved. It should be noted that if the ratio L2/L0 is more than 0.40, the proportion of the aramid fibers in the composite cord is decreased accordingly. Thereby, the advantages of the aramid fibers are not fully exerted, and as a result, the steering stability of the tire is decreased.

MODE FOR CARRYING OUT THE INVENTION

An embodiment of the present invention will now be described in detail.

Figure 1:
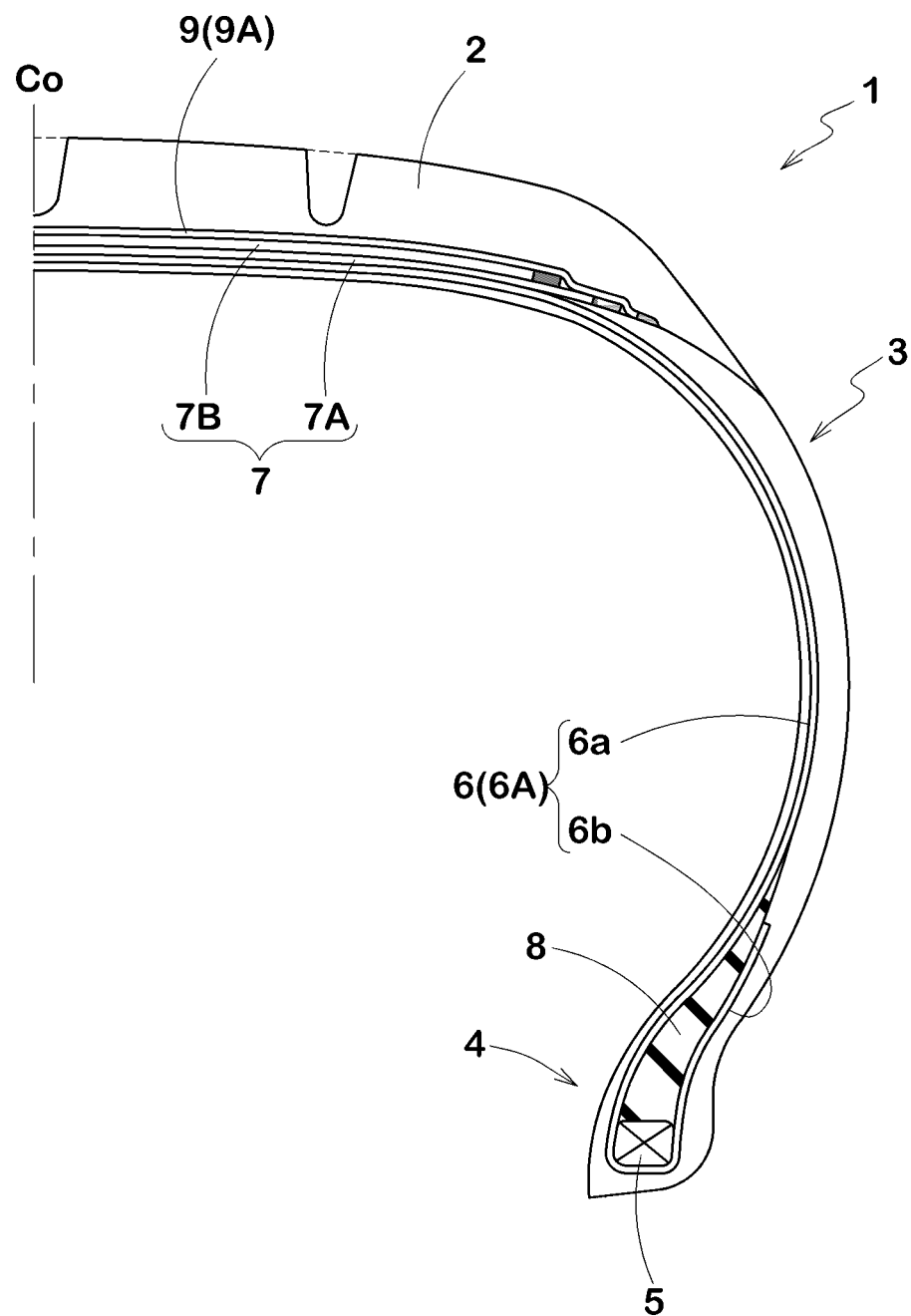
FIG. 1 a cross-sectional view showing an embodiment of a tire using a composite cord of the first invention as a tire cord.

As shown in FIG. 1, a tire 1 of this embodiment is formed as a pneumatic tire for passenger cars. However, it is not limited to this, and the tire 1 may be formed as a pneumatic tire, for example, for motorcycles or heavy duty vehicles. Further, the tire 1 can be configured as a variety of tires, such as a non-pneumatic tire (for example, an airless tire) which is not filled with pressurized air.

The tire 1 has a carcass 6 extending between bead cores 5 of bead portions 4 via a tread portion 2 and sidewall portions 3, a belt layer 7 arranged inside the tread portion 2 and radially outside the carcass 6, and a band layer 9 arranged radially outside the belt layer 7.

The carcass 6 is formed of one or more carcass plies, in the present embodiment one carcass ply 6A, having carcass cords arranged at an angle of, for example, 75 degrees or more and 90 degrees or less with respect to a tire circumferential direction. This carcass ply 6A has a toroidal ply main body (6a) extending between the bead cores 5 and 5, and ply turned up portions (6b) arranged at both ends of the ply main body and each turned up around the respective bead core 5 from inside to outside in a tire axial direction.

In the bead portions 4, there is bead apex rubbers 8 for bead reinforcement each of which tapers radially outward from the respective bead core 5 through the space between the ply main body (6a) and the respective ply turned up portion (6b).

The belt layer 7 is formed of one or more belt plies, in this embodiment two belt plies 7A and 7B, having belt cords arranged at an angle of 10 degrees or more and 35 degrees or less with respect to the tire circumferential direction, for example. In this belt layer 7, the belt cords of the belt ply 7A intersect with belt cords of the belt ply 7B. Thereby, belt rigidity is increased, therefore, the tread portion 2 is firmly reinforced.

The band layer 9 is formed of one or more band ply, in this embodiment one band ply 9A, having band cords spirally wound in the tire circumferential direction. This band layer 9 restrains the movement of the belt layer 7 and suppresses the lifting of the tread portion 2 due to centrifugal force. This can contribute to improvement of the high-speed durability and improvement of noise performance.

As the band ply 9A, a pair of left and right edge band plies covering only axially outer edges of the belt layer 7 and a full band ply covering substantially the entire width of the belt layer 7 can be employed. In this embodiment, a case where the band ply 9A is the full band ply is illustrated.

Figure 2A:
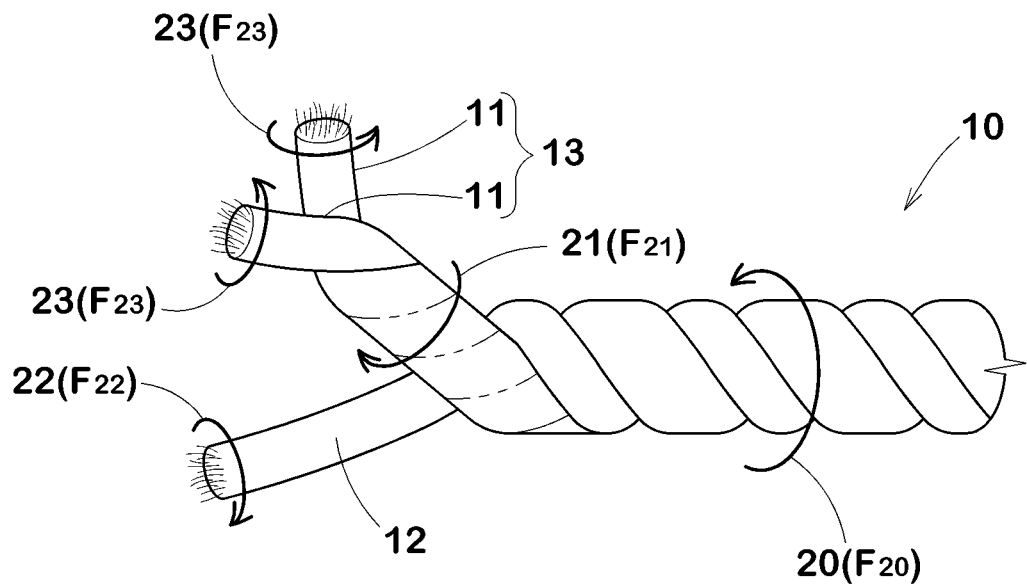
FIGS. 2A and 2B perspective views conceptually showing the composite cord.
Figure 2B:
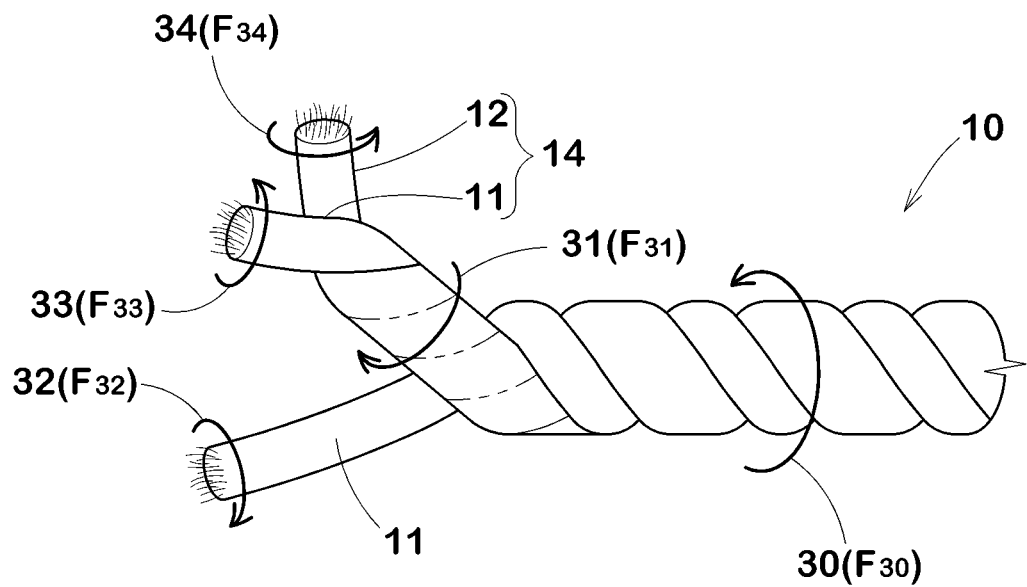

In this embodiment, a composite cord 10 is employed as the band code mentioned above. As shown in FIGS. 2A and 2B, the composite cord 10 consists of two first strands 11 made of aramid fibers and one second strand 12 made of nylon fibers.

Figure 3:
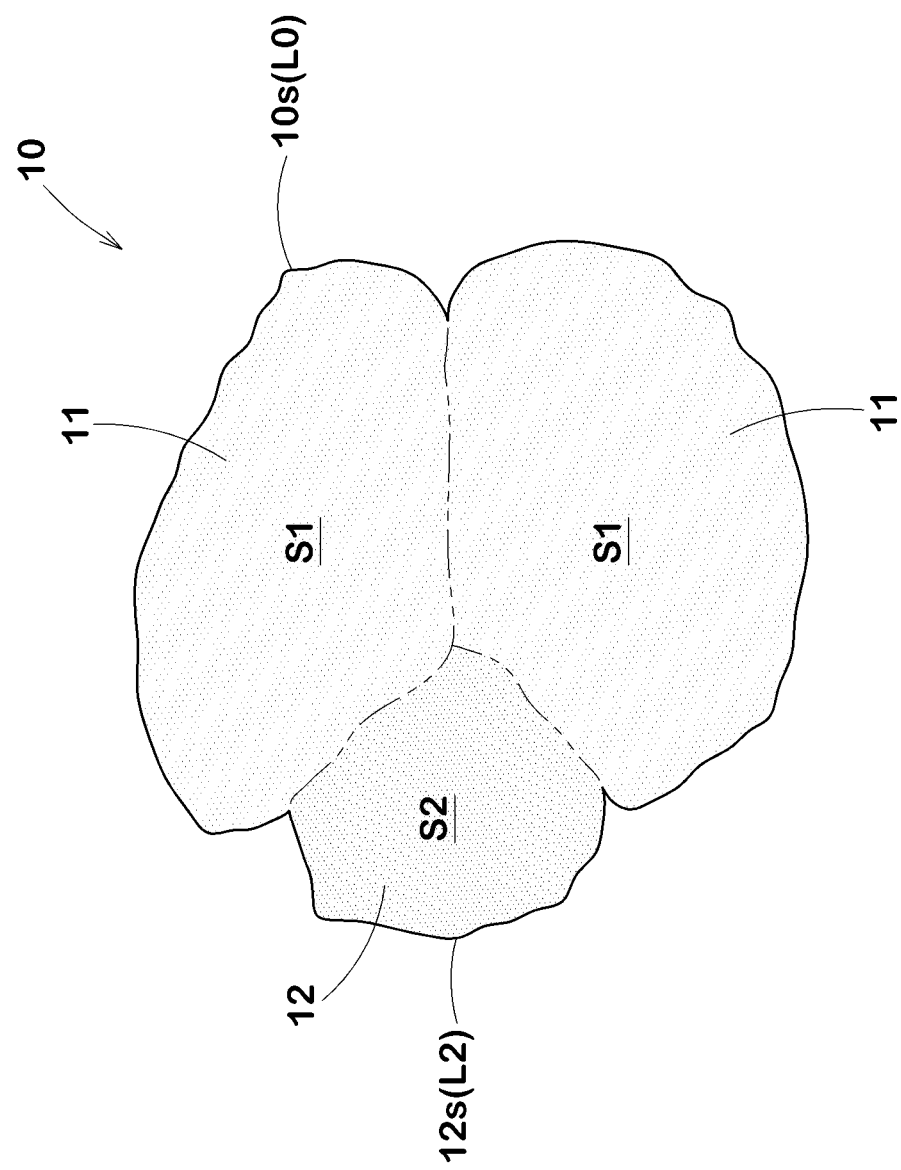
FIG. 3 a cross-sectional view of the composite cord taken perpendicular to a cord length direction thereof.

In the present invention, as shown in FIG. 3, in a cross section perpendicular to a cord length direction, a ratio L2/L0 of a length L0 of an exposed surface (10s) of the composite cord 10 measured along the circumference of the cord and a length L2 of an exposed surface (12s) of the second strand 12 measured along the circumference of the cord is regulated in the range of 0.30 or more and 0.40 or less.

The exposed surfaces (10s) and (11s) are the surfaces exposed to the outside of the cord, and correspond to the surfaces in contact with the rubber in the tire 1. Therefore, setting the aforementioned ratio L2/L0 to 0.30 or more can ensure a sufficient bonding area with rubber in the second strand 12 (nylon fiber) which has excellent bonding properties with rubber. Thereby, the rubber adhesion of the entire composite cord 10 can be increased. On the contrary, if the ratio L2/L0 is more than 0.40, the proportion of the aramid fibers in the composite cord 10 is decreased accordingly. As a result, the advantage of aramid fiber, which is to increase tire rigidity, is not fully exerted, thereby, the steering stability of the tire is decreased.

It should be noted that the lengths L0 and L2 along the circumference of the cord of the exposed surfaces (10s) and (12s) can be obtained by the following method. A sample of the composite cord 10 taken from the tire 1 is sectioned by using, for example, FIB (Focused Ion Beam). After that, an image of the cross-section can be obtained by using, for example, a SEM (Scanning Electron Microscope), and the lengths L0 and L2 can be obtained by image analysis of this image.

Here, in order to obtain the composite cord 10 having the ratio L2/L0 in the above range, a 2+1 twisted structure is preferred, in which an intermediate strand 13 consisting of two first strands 11 twisted together and one second strand 12 are twisted together as shown in FIG. 2A (first embodiment). Further, in another example, a 2+1 twisted structure is also preferred, in which an intermediate strand 14 consisting of one first strand 11 and one second strand 12 twisted together and one first strand 11 are twisted together as shown in FIG. 2B (second embodiment).

That is, two strands selected from the three strands 11, 11, and 12 are twisted together to form the intermediate strand 13 or 14, and then this intermediate strand 13 or 14 is twisted with the remaining strand. Therefore, the length L2 of the exposed surface (12s) of the second strand 12 (nylon fiber) can be increased.

Figure 4:
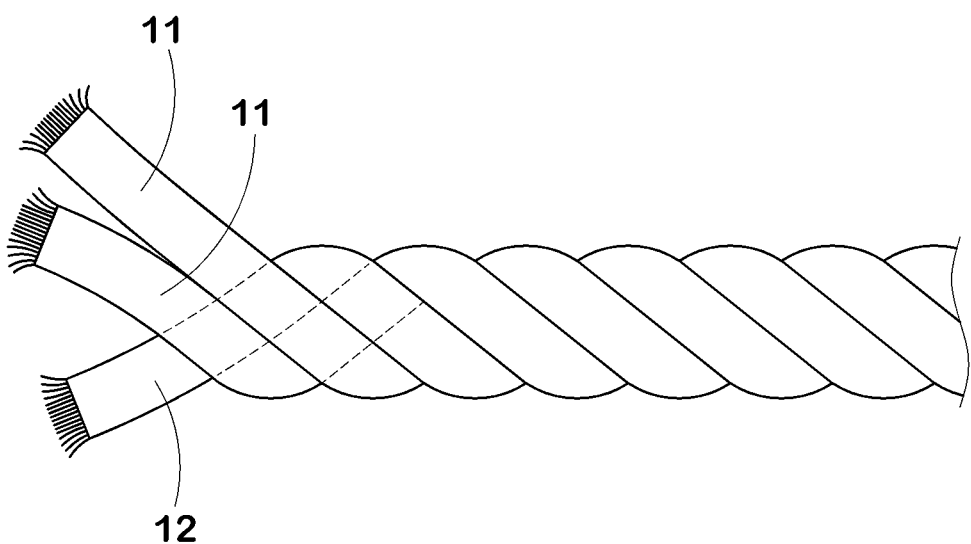
FIG. 4 a perspective view conceptually showing the composite cord according to another embodiment.

In contrast, as shown in FIG. 4, in the case of a 1×3 twisted structure in which three strands 11, 11, and 12 are twisted together without forming an intermediate strand, the length L2 of the exposed surface (12s) of the second strand 12 (nylon fiber) becomes relatively small, therefore, it is made difficult to achieve the relationship L2/L0≥0.40.

In the case of the first embodiment (shown in FIG. 2A), in terms of the twist direction, it is preferred that a twist direction F20 of an upper twist 20 of the composite cord 10 is opposite to a twist direction F21 of an intermediate twist 21 of the intermediate strand 13 and a twist direction F22 of a lower twist 22 of the second strand 12. Further, it is also preferred that a twist direction F23 of a lower twist 23 of the first strand 11 is opposite to the twist direction F21 of the intermediate strand 13.

Furthermore, as for the number of twists, it is preferred that the number of twists N20 in the upper twist 20, the number of twists N21 in the intermediate twist 21, the number of twists N22 in the lower twist 22, and the number of twists N23 in the lower twist 23 are in the following ranges.

The number of twists N20 is preferably 21.0 or more and 29.0 or less, and more preferably 23.0 or more and 27.0 or less.
The number of twists N21 is preferably 20.0 or more and 28.0 or less, and more preferably 22.0 or more and 26.0 or less.
The number of twists N22 is preferably 23.5 or more and 31.5 or less, and more preferably 25.5 or more and 29.5 or less.
The number of twists N23 is preferably 24.0 or more and 32.0 or less, and more preferably 26.0 or more and 30.0 or less.
Further, as for the number of twists, the following relationship N21≤N20≤N22≤N23 is preferred.

Further, in the case of the second embodiment (shown in FIG. 2B), as for the twist direction, it is preferred that a twist direction F30 of an upper twist 30 of the composite cord 10 is opposite to a twist direction F31 of an intermediate twist 31 of the intermediate strand 14 and a twist direction F32 of a lower twist 32 of the first strand 11. Furthermore, it is preferred that a twist direction F33 of a lower twist 33 of the first strand 11 and a twist direction F34 of a lower twist 34 of the second strand 12 are opposite to the twist direction F31 of the intermediate strand 14.

Furthermore, as for the number of twists, it is preferred that the number of twists N30 in the upper twist 30, the number of twists N31 in the intermediate twist 31, the number of twists N32 in the lower twist 32, the number of twists N33 in the lower twist 33, and the number of twists N34 in the lower twist 34 are in the following ranges.
The number of twists N30 is preferably 21.0 or more and 29.0 or less, and more preferably 23.0 or more and 27.0 or less.
The number of twists N31 is preferably 21.5 or more and 29.5 or less, and more preferably 23.5 or more and 27.5 or less.
The number of twists N32 is preferably 24.0 or more and 32.0 or less, and more preferably 26.0 or more and 30.0 or less.
The number of twists N33 is preferably 23.5 or more and 31.5 or less, and more preferably 25.5 or more and 29.5 or less.
The number of twists N34 is preferably 23.5 or more and 31.5 or less, and more preferably 25.5 or more and 29.5 or less.
Further, as for the number of twists, the following relationships N30≤N31≤N33≤N32 and N30≤N31≤N34≤N32 are preferred.

The numbers of twists N20 to N23 and N30 to N34 each mean the number of twists per 10 cm length (times/10 cm).

As shown in FIG. 3, in the composite cord 10, it is preferred that a ratio S2/S0 of a cord cross-sectional area S0 of the composite cord 10 and a cross-sectional area S2 of the second strand 12 is 0.3 or less. If the ratio S2/S0 is more than 0.3, the proportion of aramid fibers in the composite cord 10 is decreased. As a result, the advantage of aramid fiber, which is to increase the tire rigidity, is not fully exerted, thereby, the steering stability of the tire is decreased. The lower limit of the ratio S2/S0, is regulated by the aforementioned ratio L2/L0.

Here, the cord cross-sectional area S0 is defined by a sum (2×S1+S2) of the cross-sectional area S2 of the second strand 12 and a cross-sectional area S1 of each of the first strands 11. Further, strictly speaking, the cross-sectional area S1 is defined by a value obtained by dividing a fineness (D) of the first strand 11 by a specific gravity ρ of the aramid fiber. Furthermore, the cross-sectional area S2 is defined by a value obtained by dividing the fineness (D) of the second strand 12 by the specific gravity ρ of the nylon.

The composite cord 10 can also be used for tire cords other than the band cords, such as the carcass cords, the belt cords, and the like, for example.

While detailed description has been made of the especially preferred embodiments of the present invention, the present invention can be embodied in various forms without being limited to the illustrated embodiments.

Working Example

In order to confirm the effectiveness of the invention, the composite cords were made by way of test according to the specifications shown in Table 1 and pneumatic tires (265/35R18) using the test composite cords as the band cords were made. Then, cord strength and rubber pull-out resistance of each of the composite cords were measured. Further, the steering stability and the high-speed durability were measured for each of the pneumatic tires. The pneumatic tires had substantially the same configuration except for the banded cords (composite cords). The only difference between Example 2 and Example 3 was the number of twists.

The length L0 (the length of the exposed surface of the composite cord measured along the circumference of the cord) and the length L2 (the length of the exposed surface of the second strand measured along the circumference of the cord) were obtained by image analysis of the cross-sectional image of the composite cord obtained by using SEM after sectioning the composite cord by using FIB, and then the ratio L2/L0 was calculated based on this.

(1) Cord Strength:
The load at break of the composite cord was measured in accordance with Japanese Industrial Standard JIS L1017 ("Tensile strength and elongation rate" described in Section 8.5 of Test method for chemical fiber tire cords). The larger the numerical value, the higher the cord strength is.

(2) Rubber Pull-Out Resistance:
The composite cords were rubber-coated with topping rubber, and the composite cords were pulled with a tensile testing machine (INTESCO 2005 type) at a tensile speed of 50 mm/min, and the pull-out resistance when the composite cords were pulled out of the topping rubber was measured. The results are indicated by an index based on the resistance of Reference 1 being 100. The larger the numerical value, the stronger the bonding force is.

(3) Steering Stability:
The tires were mounted on all wheels of a vehicle (rear-wheel drive vehicle with a displacement of 2600 cc) under the conditions of rim (18×9.5J) and tire inner pressure (200 kPa). The vehicle was driven on an asphalt road surface of a circuit course, and the steering stability was evaluated by the driver's feeling. The results are shown in a 5-point scale. The larger the numerical value, the more preferable it is.

(4) High-Speed Durability:
By using a drum testing machine, the tires were run on the drum at a speed of 200 km/h under the conditions of rim (18×9.5J), tire inner pressure (200 kPa), and longitudinal load (7.0 kN). The ambient temperature was 30 degrees Celsius. The run was stopped periodically to check for tire damage. When the outer surface of the tire bulged by 50 mm or more due to the occurrence of belt edge delamination, or when delamination of the tread occurred, the running was stopped and the running time up to that point was recorded. The results are indicated by an index based on the running time of the Reference 1 being 100. The larger the numerical value, the better the high-speed durability is.

TABLE 1

|  | Example 1 | Example 2 | Example 3 | Reference 1 | Reference 2 | Reference 3 |
|---|---|---|---|---|---|---|
| First strand (aramid) | 1670 dtex two | 1670 dtex two | 1670 dtex two | 1670 dtex two | 1670 dtex three | 1100 dtex one |
| Second strand (nylon) | 940 dtex one | 940 dtex one | 940 dtex one | 940 dtex one | — | 940 dtex one |
| Twisted structure | 2 + 1 FIG. 2A | 2 + 1 FIG. 2B | 2 + 1 FIG. 2B | 1 × 3 FIG. 4 | 1 × 3 — | 1 × 2 — |
| Ratio L2/L0 | 0.4 | 0.35 | 0.3 | 0.2 | 0 | 0.52 |
| Ratio S2/S0 | 0.26 | 0.26 | 0.26 | 0.26 | 0 | 0.52 |
| Cord strength | 550 | 550 | 550 | 550 | 700 | 210 |
| Rubber pull-out resistance | 153 | 129 | 112 | 100 | 88 | 139 |
| High-speed durability | 120 | 120 | 120 | 100 | 80 | 110 |
| Steering stability | 4 | 4 | 4 | 4 | 5 | 3.5 |

As shown in Table 1, it can be confirmed that the composite cords in the Examples fully exerted the advantage of aramid fiber, which is the effect of increasing the tire rigidity, and were able to improve the high-speed durability by increasing adhesion with rubber while ensuring excellent steering stability.

DESCRIPTION OF REFERENCE SIGNS

1 tire
10 composite cord
10*s* exposed surface
11 first strand
12 second strand
12*s* exposed surface

The invention claimed is:

1. A composite cord consisting of two first strands formed of aramid fibers and one second strand formed of nylon fibers, wherein
in a cross section perpendicular to a cord length direction, a ratio L2/L0 of a length L0 of an exposed surface of the composite cord along a circumference of the cord and a length L2 of an exposed surface of the second strand along the circumference of the cord is in a range of 0.30 or more and 0.40 or less, and
a ratio S2/S0 of a cord cross-sectional area S0 of the composite cord and a cross-sectional area S2 of the second strand is 0.3 or less.

2. The composite cord according to claim 1 having a 2+1 twisted structure in which an intermediate strand formed by two first strands twisted together and one second strand are twisted together.

3. The composite cord according to claim 2, wherein a twist direction F20 of an upper twist of the composite cord is opposite to a twist direction F21 of an intermediate twist of the intermediate strand and a twist direction F22 of a lower twist of the second strand.

4. The composite cord according to claim 3, wherein a twist direction F23 of a lower twist of each of the first strands forming the intermediate strand is opposite to the twist direction F21 of the intermediate strand.

5. The composite cord according to claim 2, wherein when the upper twist of the composite cord has the number of twists N20, the intermediate twist of the intermediate strand has the number of twists N21, the lower twist of the second strand has the number of twists N22, and the lower twist of each of the first strands has the number of twists N23, a following relationship is satisfied:

$N21 \leq N20 \leq N22 \leq N23$.

6. The composite cord according to claim 1 having a 2+1 twisted structure in which an intermediate strand formed by one first strand and one second strand twisted together and one first strand are twisted together.

7. The composite cord according to claim 6, wherein a twist direction F30 of an upper twist of the composite cord is opposite to a twist direction F31 of an intermediate twist of the intermediate strand and a twist direction F32 of a lower twist of the first strand.

8. The composite cord according to claim 7, wherein a twist direction F33 of the lower twist of the first strand forming the intermediate strand and a twist direction F34 of a lower twist of the second strand are opposite to the twist direction F31 of the intermediate twist of the intermediate strand.

9. The composite cord according to claim 6, wherein when the upper twist of the composite cord has the number of twists N30, an intermediate twist of the intermediate strand has the number of twists N31, a lower twist of the first strand has the number of twists N32, and a lower twist of the first strand forming the intermediate strand has the number of twists N33, and a lower twist of the second strand has the number of twists N34, either of following relationships is satisfied:

$N30 \leq N31 \leq N33 \leq N32$ or $N30 \leq N31 \leq N34 \leq N32$.

10. A tire using the composite cord according to claim 1 as a tire cord.

* * * * *